June 14, 1932.  W. W. SIBSON ET AL  1,862,771
AUTOMATIC DRYING MACHINE
Filed Sept. 7, 1927  7 Sheets-Sheet 1
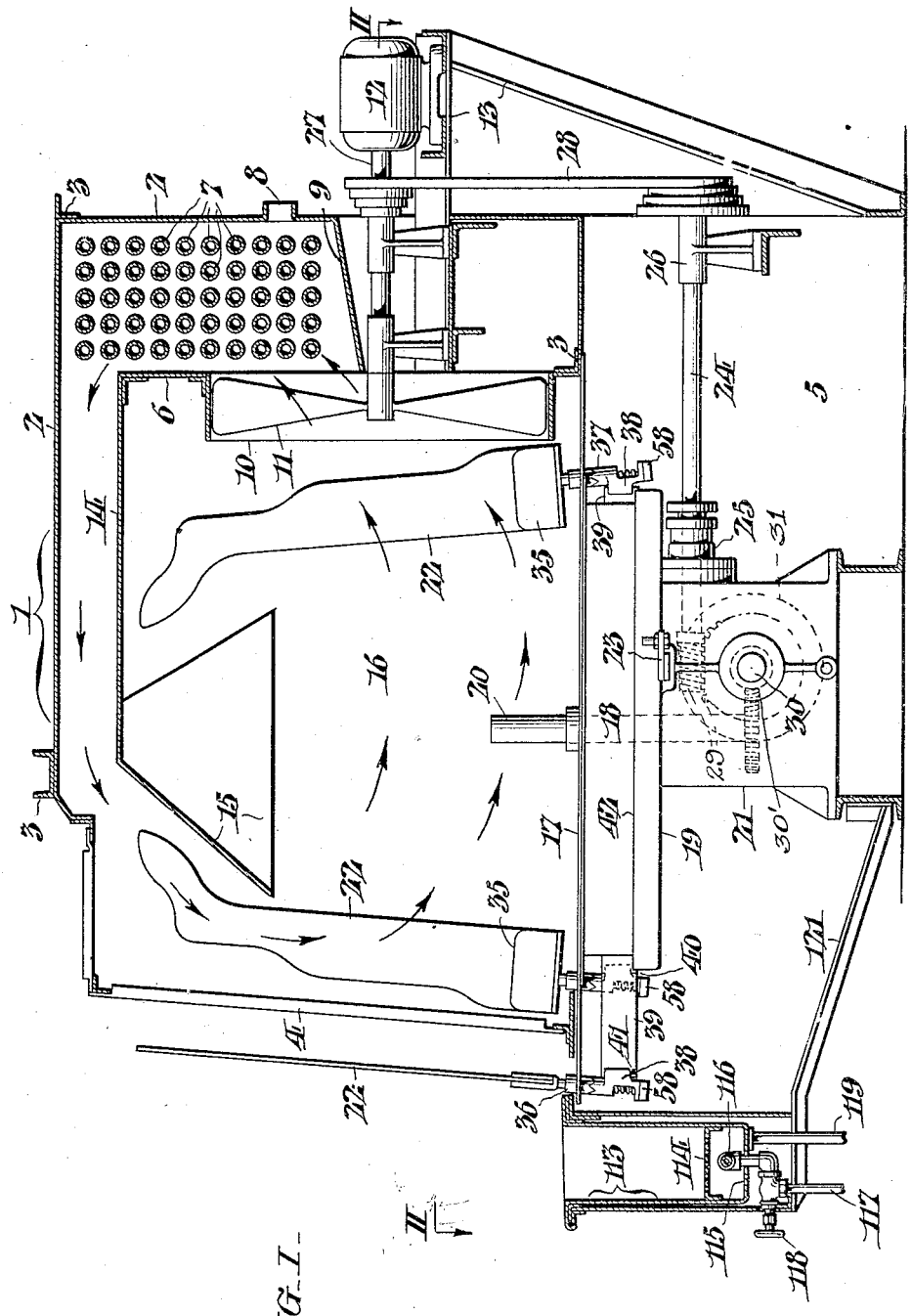
FIG. I.
WITNESSES
George M. Muschamp
William Bell
INVENTORS:
Walter W. Sibson &
Harry H. Wigglesworth,
BY Harry Paul
ATTORNEYS.

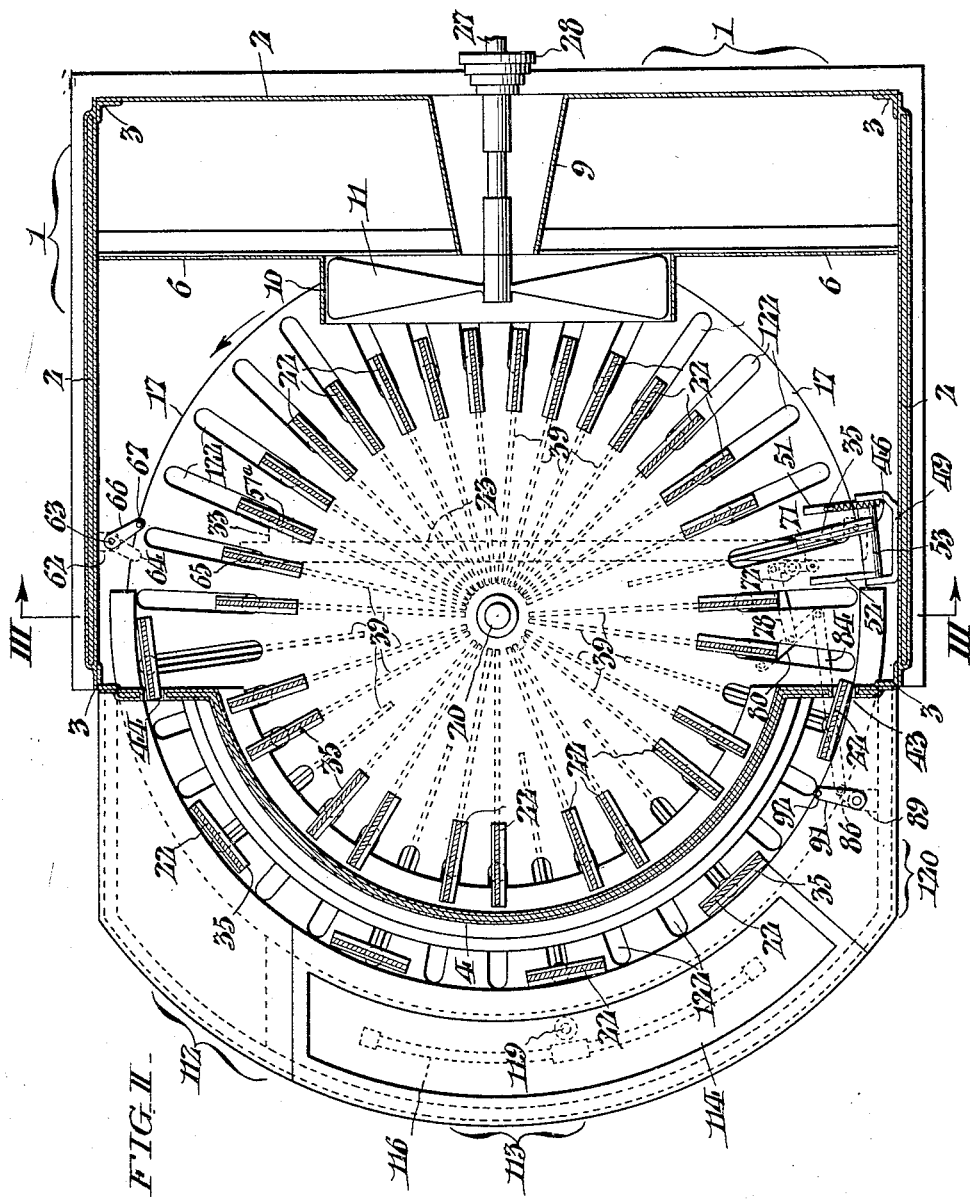

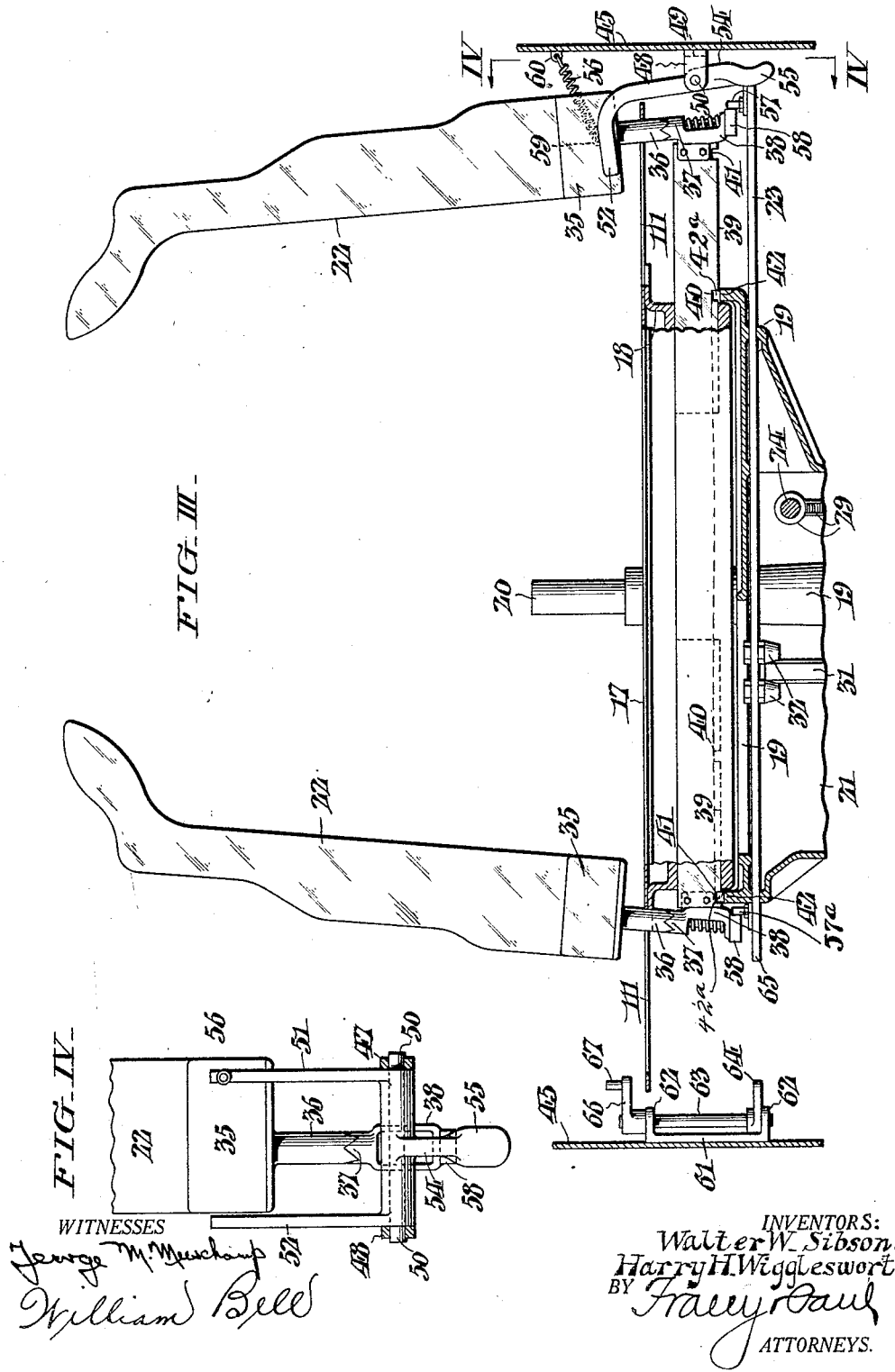

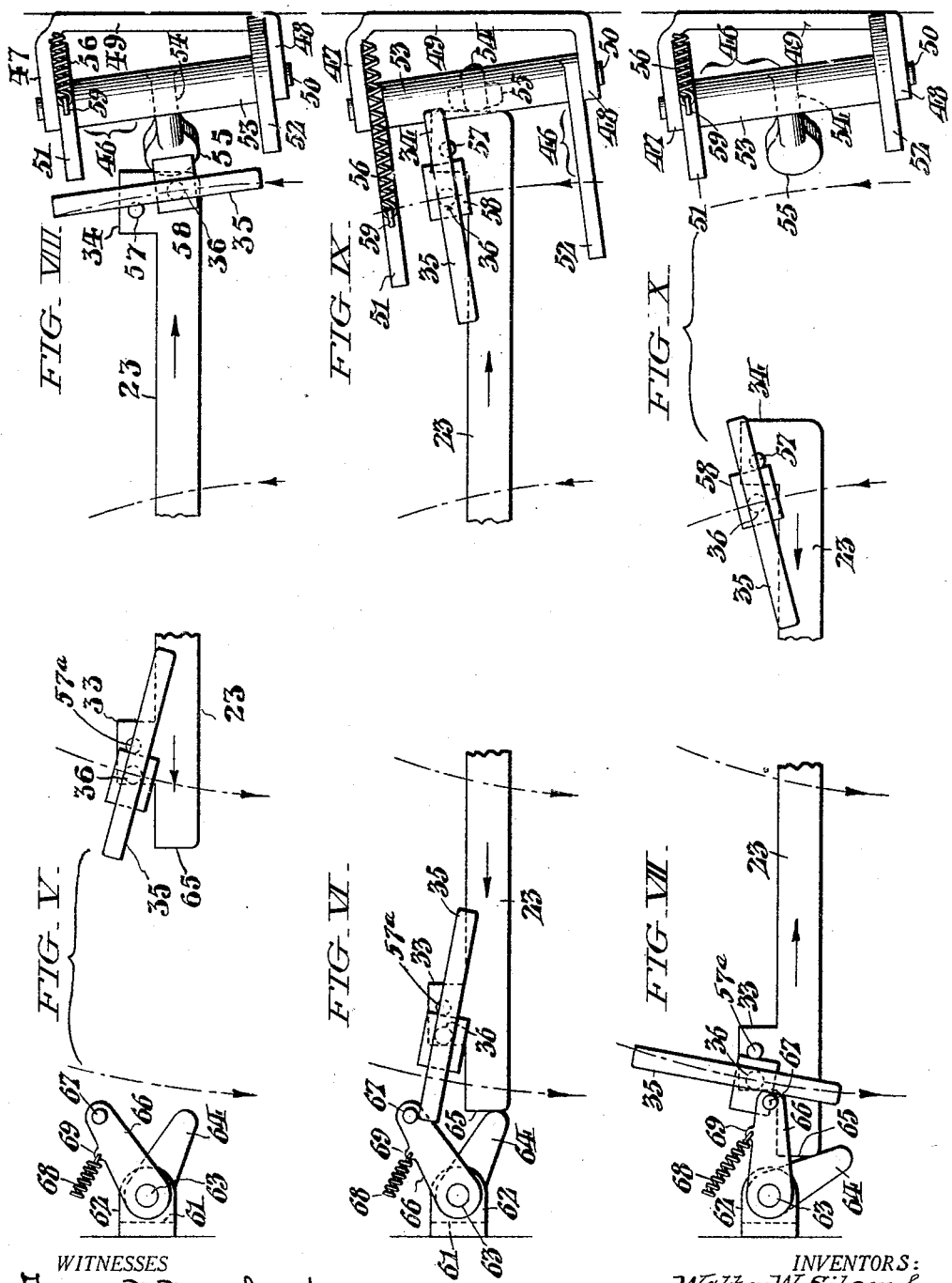

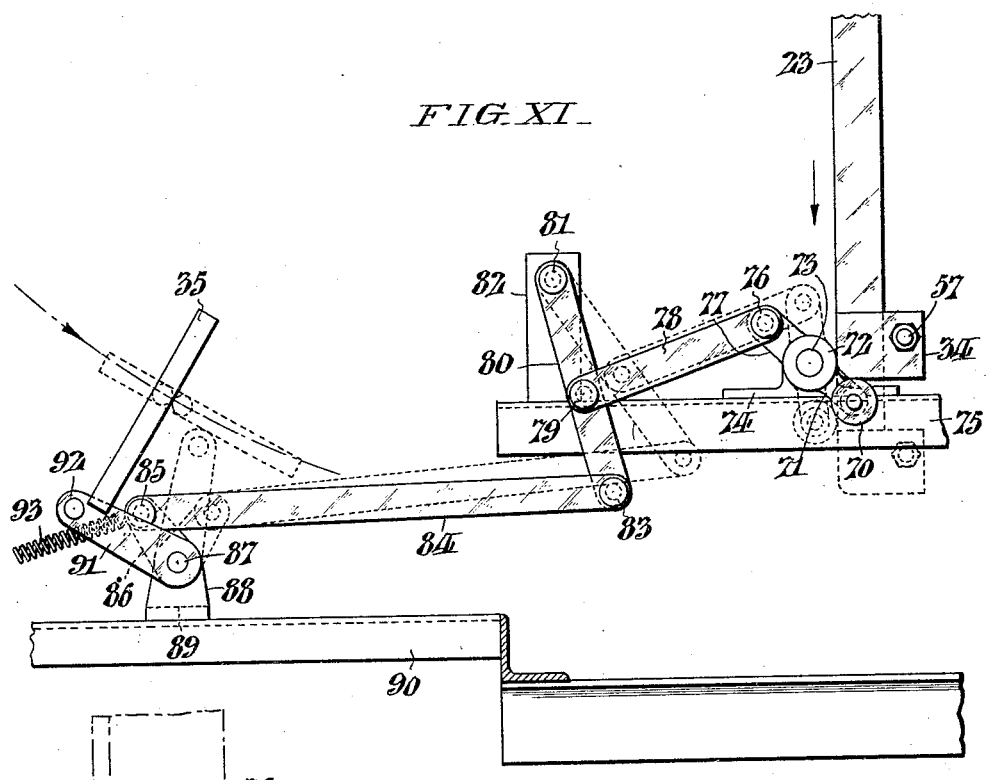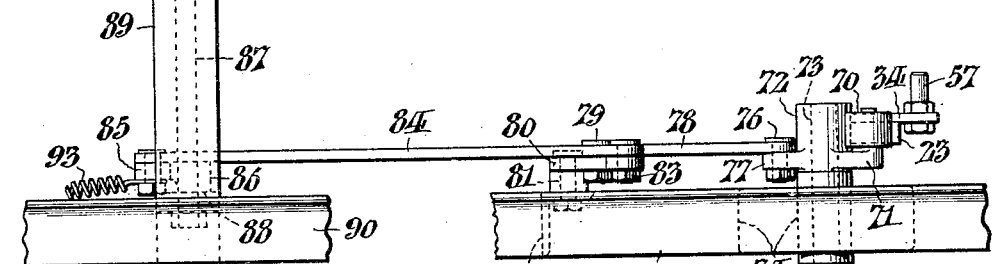

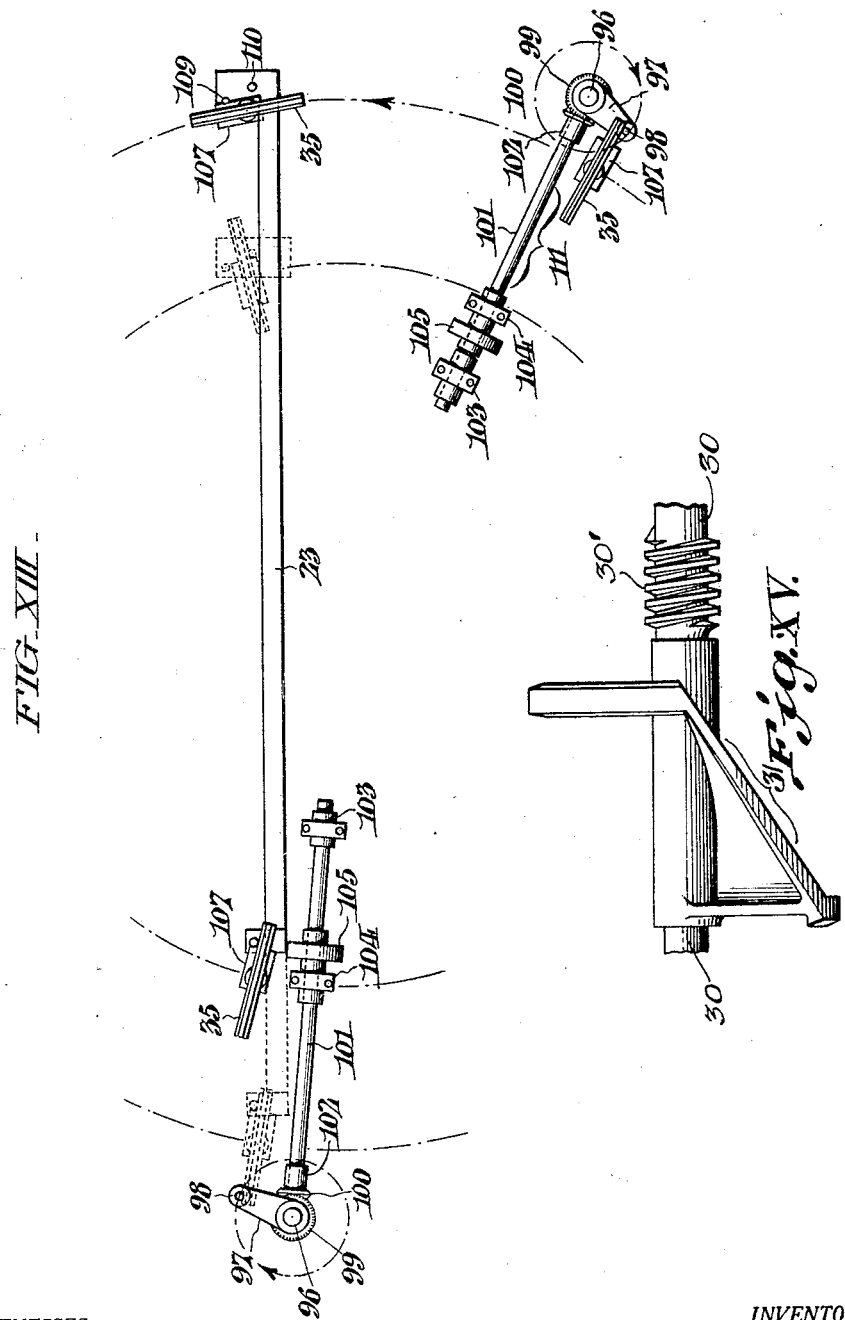

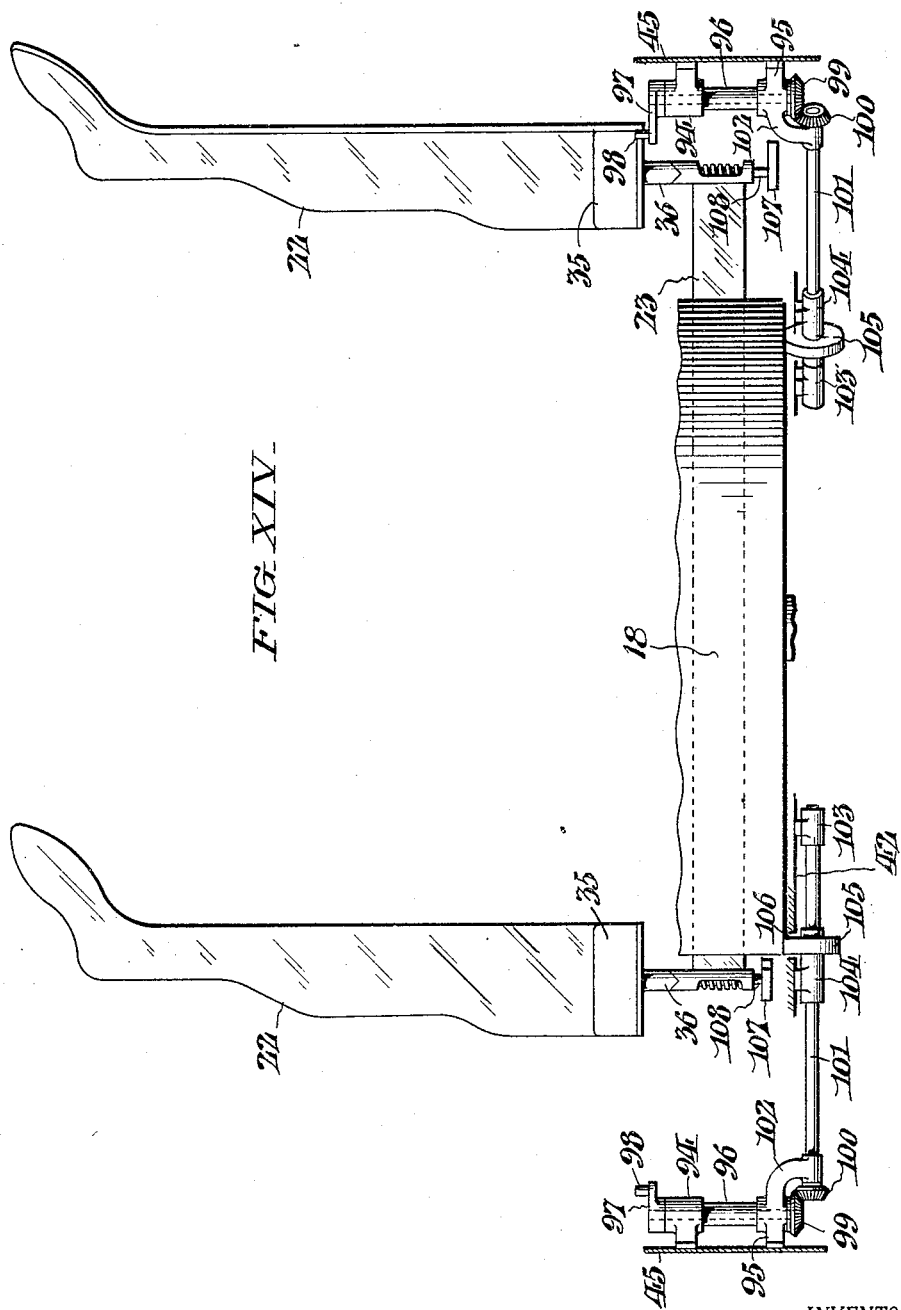

Patented June 14, 1932

1,862,771

UNITED STATES PATENT OFFICE

WALTER W. SIBSON AND HARRY H. WIGGLESWORTH, OF PHILADELPHIA, PENNSYLVANIA, ASSIGNORS TO THE PHILADELPHIA DRYING MACHINERY COMPANY, OF PHILADELPHIA, PENNSYLVANIA, A CORPORATION OF PENNSYLVANIA

AUTOMATIC DRYING MACHINE

Application filed September 7, 1927. Serial No. 217,924.

This invention relates to drying machines. It is more particularly concerned with the movement of carrier devices for articles to be dried, including the turning or angular adjustment of such carriers for entering and leaving a drying enclosure, and for travel therein. Various advantages afforded by the invention will appear from the description hereinafter of particular embodiments thereof.

In the drawings, Fig. I shows a vertical mid-section through an automatic drying machine embodying the invention.

Fig. II shows a horizontal section, taken as indicated by the line and arrows II—II in Fig. I.

Fig. III is a fragmentary vertical mid-section at right angles to Fig. I, taken as indicated by the line and arrows III—III in Fig. II.

Fig. IV is a fragmentary elevation of one of the carrier-turning devices, taken as indicated by the line and arrows IV—IV in Fig. III.

Fig. V is a fragmentary plan view of another carrier-turning or aligning device, and of cooperating parts of the machine.

Fig. VI is a similar view illustrating an initial stage of action of the device shown in Fig. V.

Fig. VII is a similar view showing the conclusion of the action of the device shown in Figs. V and VI.

Fig. VIII is a fragmentary plan view of still another carrier-turning or aligning device and of cooperating parts of the machine.

Fig. IX is a similar view showing a stage in the action of the device shown in Fig. VIII.

Fig. X is a similar view illustrating the conclusion of the action of the device shown in Figs. VIII and IX.

Fig. XI is a fragmentary plan view of yet another carrier-turning or aligning device, illustrating its action.

Fig. XII is a corresponding elevation, with part of the machine frame omitted.

Fig. XIII is a fragmentary plan view of somewhat modified devices and mechanisms for turning, aligning, and moving the article carriers.

Fig. XIV is a corresponding elevation; and,

Fig. XV is a side view of a cam device also shown in Figs. I and III.

In the machine here shown (Figs. I and II), there is an enclosure 1 in which articles to be dried, such as stockings, are subjected to the drying atmosphere while mounted on carriers 22 such as stocking forms. The enclosure 1 is built of thermo-insulative sheets 2 and standard structural sections 3, with an outward bellied curved wall 4 (at the left), all supported at an elevation above the floor by a substructure 5. In the enclosure 1 is a vertical partition 6 defining a chamber (at the right) for a bank of heating coils 7. This chamber has an exhaust outlet 8 in the (right-hand) wall of the enclosure 1. From the upper end of the partition 6, a horizontal baffle 14 extends to the left, with a depending conical skirt or canopy 15 at its edge. In an opening in the partition 6 is mounted the casing 10 of a rotary fan 11 whose shaft 27 extends out through an air conduit 9 across the heating coil chamber to an electric motor 12 on a support 13. The fan 11 circulates the air from the drying chamber 16, below the baffle 14 and canopy 15, up over the heating coils 7, and then to the left above the baffle 14 and downward and to the right through the chamber 16 again (Fig. 1).

The carriers 22 are periodically introduced into the enclosure 1, to permit articles on them to dry, and withdrawn therefrom to permit the dried articles to be removed and replaced with wet ones. Accordingly, the carriers 22 are circulated or "progressed" over a course or cycle of travel extending partly outside of the enclosure 1 and drying chamber 16, and partly through said chamber, being carried along by a horizontal (counter-clockwise) revolving table structure 18 whose "platen" top 17 forms the bottom of the chamber 16, and extends under and outside of the front wall 4 of the latter. The carriers 22 enter and leave the chamber 16 through narrow upright slots 43, 44 in portions of the enclosure wall flanking its rounded portion 4. While passing through these openings 43, 44 and while outside the enclosure 1, the carriers 22 may extend "circumferentially" of the table 18, but while inside the enclosure 1, they preferably lie in radial planes, toe in (Figs. I and III). Just after entering the enclosure 1, the carriers 22 are turned about 90° from circumferential to radial position; just before leaving it, they are again turned 90° from radial to circumferential position.

The table 18 is driven (Figs. I and III) by a vertical shaft 20 which may itself be driven from the fan-motor shaft 27, through connections including a stepped pulley and belt drive 28, a horizontal shaft 24 mounted in bearings 25, 26, worm gearing 29, a horizontal shaft 30 on which is also mounted an axially acting cam 31, and worm gearing 30′. The parts 29, 30, 31, 30′ are shown as enclosed in a gear box or pedestal structure 21 surmounted by a (fixed) canopy structure 19 just beneath the table 18.

As shown in Figs. I and III, each carrier 22 includes a stocking form removably (or otherwise) supported by a foot piece or holder 35 whose crown-toothed shank 36 (located off-center toward the heel of the carrier form) cooperates with a correspondingly toothed rotary member 37 in a bearing bracket 38. Each bracket 38 is mounted on a radial slide bar 39 itself mounted in radial guide slots in the structure 18; and the platen 17 has radial slots 122 to permit radial movement of the holder-shanks 36 with the slide-bars 39. While the carriers 22 are travelling inside the enclosure 1, the bars 39 and the carriers occupy the retracted, inner positions shown in dotted lines in Fig. II; but while the carriers are leaving the enclosure at 44, travelling outside, and reentering it at 43, the bars 39 and the carriers occupy the extended, outer positions also shown in dotted lines in Fig. II. As shown in Fig. III, provision is made for definitely holding or locking the slide bars 39 in their proper extended and retracted positions, by engagement of an upstanding ridge or flange 42 on the stationary structure 19 in notches 40, 41 in the bars. Each bar 39 has two such notches 40, 41 in its lower edge, one to hold it extended (as at the right of Fig. III), and the other to hold it retracted (as at the left of Fig. III). At the locations where the bars 39 and carriers 22 are to be radially shifted, the flange 42 has cut-outs 42a through which the bars 39 may move.

As shown in Figs. I, II, and III, the slide bars 39 and carriers 22 are radially shifted, and the carriers turned as above described, by means controlled and operated by a "selector" device 23. This selector 23 comprises a horizontal bar longitudinally slidable in guide ways in the (stationary) structure 19, and actuated by the axially-acting cam 31 (see also Fig. XV), whose edge engages between rollers 32, 32 mounted on the bar 23. The ratio of the gearing 30′ controls the relation between the cycle of a carrier 22 (as determined by the selector 23) and the revolution of the table 18: i. e., what part or multiple of a complete round of the chamber 16 (with the table 18) a carrier 22 makes between its entrance at 43 and its exit at 44. In the present instance, the complete cycle of a carrier 22 extends throughout three complete revolutions of the table 18: i. e., in each cycle the carrier makes about 2½ revolutions inside the enclosure 1 and ½ revolution outside. However, it will be understood that this can be varied, as indicated above.

Referring, now, to Fig. II, it will be seen that the selector bar 23 extends transversely of the drying chamber 16, beneath the table 18 and at one side of its drive shaft 20, and that at or near its ends it has lateral (edge) off-sets or toe projections 34, 33, on which are upstanding studs 57, 57a (Figs. III and V-X). These are located in position to cooperate with the feet 58 of the bearing brackets 38 of carriers 22, 22 at opposite sides of the table 18, that have just entered the chamber 16 and have just about completed their travel in said chamber, respectively,—Figs. II and III. When these slowly moving carriers 22, 22 and their bars 39 reach the positions shown in Fig. III, where the cut-outs 42a in the locking ridge 42 are located, the cam 31 quickly shifts the selector bar 23 rearward, pushing the front carrier 22 (that has just before entered at 43) to the inner limit of movement permitted by the slot 122, and pushing the rear carrier 22 (that is ready to leave at 44) to the outer limit of movement permitted by its slot 122. These movements are effected by engagement of the studs 57, 57a with the feet 58, 58 of the bearing brackets 38, 38. At about the same time, the carriers 22 at opposite sides of the table 18 are turned 90° by means engaged and actuated by the ends of the member 23, as described hereinafter.

As each carrier 22 approaches the narrow entrance opening 43, it comes within the range of action of an aligning device, shown in Figs. II, XI, and XII as comprising a crank arm 91 provided with an upstanding actuator pin or stud 92 for engaging the carrier-holder 35. The crank arm 91 is fast on an upright rock shaft 87, journalled in lugs 88 of a bracket 89 secured to the machine frame structure 90. The shaft 87 has a crank arm 86 that is connected by a link 84 (with pivots 85, 83) to a swinging arm 80 fulcrumed at 81 on a portion 82 of the frame member 75, and connected by a link 78 (with pivots 79, 76) to an arm 77 of a rock lever 72 pivoted at 73 (to a bracket 74 on the frame member 75) whose other end 71 has a contact roller 70. Normally, the parts are held in their full-line positions of Fig. XI by a helical tension spring 93 connected to the pivot 85 that connects the arm 86 to the link 84. However, as the selector 23 is moved forward (Figs. II and XI) by the cam 31 (just prior to its rearward movement as above described), the end of said bar 23 encounters the roller 70 and wipes past it, rocking the members 72 and 91 from the full line positions of Fig. XI to the dotted positions (and to the full line position of Fig. II). If the carrier 22 is properly aligned to pass the opening 43, it is not displaced; but if it should lie at a wrong angle, as shown in full lines in Fig. XI, then the stud 92 engages its holder 35 above the table top 17 and swings it around to the correct dotted circumferential position of Fig. XI.

After entering the enclosure 1, each carrier 22 is turned from circumferential position to radial toe-in position by a turning device 46, located adjacent the position where the bar 39 is retracted as above described. As shown in Figs. II, III, IV, and VIII–X, the turning device 46 comprises a forked lever with carrier-holder-engaging arms 51, 52 extending upward from an axial portion 53, and an operating arm 54 extending downward therefrom, and terminating in a flat contact portion 55 to be engaged and acted on by the toe end 34 of the selector 23. The forked lever is pivoted at 50, between lugs 47, 48 of a bracket 49 mounted on the inside of the enclosure wall 45, to turn or swing radially of the table 18 on a horizontal axis. Normally, the lever device 46 is held in upright inactive position by a helical tension spring 56, connected between an attachment 59 on the arm 51 and an anchorage 60 on the wall 45. As shown in Fig. VIII, the axis 50 extends parallel with the path of travel of the carrier 22, and so likewise do the ends of the arms 51, 52.

The above-mentioned forward movement of the selector 23 by the cam 31 (to the right in Figs. VIII and IX) to the position of Figs. II and III occurs about as the slow-moving carrier 22 (whose bar 39 is presently to be retracted) reaches the position of Fig. VIII, with its axis 36 about mid-way between the arms 51, 52. In this movement, the end 34 of the bar 23 strikes the contact portion 55 (Fig. VIII) and rocks the arms 51, 52 forward (Figs. III and IX). Accordingly, one of the arms 51, 52 (as here shown, the arm 51) engages the "toe" end of the holder 35 above the table top 17 and turns the carrier inward to a radial toe-in position, as shown in Figs. III and IX, regardless of whether the carrier 22 is previously travelling "toe-first" or "heel-first". Immediately afterward, the above-described rearward movement of the selector 23 occurs; the arms 51, 52 swing back to normal upright position; and the now radially positioned carrier 22 is carried inward by the engagement of the stud 57 with the bearing bracket foot 58, as shown in Fig. X and already described.

As the carrier 22 that is presently to make its exit at 44 approaches or reaches its outer position under the impulsion of the rear selector stud 57a, during rearward movement of the selector 23, its holder 35 is acted on by a turning device which gives it a quarter-turn into the proper circumferential (heel-first) position for passing through the opening 44. As shown in Figs. II, III, and V–VII, this turning device comprises a crank arm 66 with an upstanding actuator pin or stud 67 for engaging the carrier-holder 35. The crank arm 66 is fast on an upright rock shaft 63 that is journalled in lugs 62 of a bracket 61 secured to the enclosure wall 45. The shaft 63 has at its lower end an arm 64, located in the path of rearward movement of the rear end 65 of the selector bar 23. Normally, the parts are held in the full line position of Figs. II and V by a helical tension spring 68 connected to the arm 66 at 69. However, as the rearward-moving radially extending carrier-holder 35 comes within range of the stud 67, as indicated in Figs. V and VI, the selector bar end 65 strikes the end of the arm 64 and wipes past it, turning the arm 66 clockwise, so that the stud 67 engages the holder 35 above the table top 17, and (with the continued rearward bodily movement of the holder 35) turns the latter counter-clockwise about 90° to the circumferential position of Fig. VII. Immediately afterward, the selector 23 reverses its movement, as indicated by the arrow in Fig. VII, and leaves the carrier 22 to travel on through the exit 44.

As shown in Figs. I and II, there is an arcuate piling table 112 just beyond the exit 44, on which the operator can pile the articles removed from the carriers 22 after they come out. Beyond and adjacent the table 112, there is an arcuate container or steam box 113, to hold articles (stockings) to be treated and condition them for "boarding" on the carriers 22 as the latter approach the entrance 43. This container 113 has a perforated false bottom 114, beneath which (above the real bottom 115) is a perforated steam pipe 116, connected with a steam supply pipe 117 through a hand valve 118, easily accessible to the operator. A drain pipe 119 is shown, to take care of water of condensation collecting beneath the false bottom 114. As shown, the top of the container 113 is in the same plane as the top of the table 112 and of a small table 120 extending to the entrance 43. All of these are supported by braces or struts 121.

Figs. XIII and XIV show modified provisions for turning or aligning the carriers 22 to circumferential positions, for entrance at 43 and for exit at 44, and also for turning them to radial position. The first-mentioned turning (aligning) devices are quite similar to those at 91 and 66 in Fig. II, but are operated by the revolving table 18, instead of by the selector 23. Accordingly, each of these turning devices comprises a crank arm 97, with an upstanding pin or stud 98, mounted on an upright shaft 96 journalled in bearing brackets 94, 95 on the casing wall 45. On the lower end of the shaft 96 is a bevel gear 99 in mesh with a bevel gear 100 on a horizontal (radial) shaft 101, which is journaled in a bearing portion 102 of the bracket 95 and in bearing brackets 103, 104 mounted on the flange 42 of the gear box structure. The shaft 101 is geared to the revolving table 18 and positively driven thereby, through the medium of a (friction) wheel 105 on the shaft engaging the lower side of the table, projecting through an opening 106 in the structure 42. The gear ratios at 105, 100, and 99 are such that the stud 98 revolves in proper phase with the movement of the carriers 22 to strike their holders 35 and turn them to circumferential positions as they approach the entrance and exit openings, as indicated in Fig. XIII. As shown in Fig. XIII, the turning device at the right, comprehensively designated 111, aligns the carriers 22 circumferentially to enter the enclosure, while that at the left turns them 90° counter-clockwise and aligns them circumferentially, toe foremost, to leave the enclosure.

As shown in Fig. XIV, the carriers 22 are vertical, and the axes 36 are on center with respect to the holders 35. On the shank pivot stem 108 is mounted, off center, a block or finger 107, extending in the plane of the holder 35 toward the toe of the carrier 22. On the selector end portion 34 are upstanding pins or studs 109, 110, adjustably mounted, and so located that one or the other of them (as shown, the further pin 109) will always engage the long end of the finger 107 as the selector 23 moves rearward or to the left (Fig. XIII) and swing the carrier 22 around to radial toe-in position, as shown in dotted lines in Fig. XIII,—no matter whether the carrier 22 is travelling toe-foremost or heel-foremost with the revolving table 18.

Having thus described our invention, we claim:

1. A machine of the character described comprising an enclosure with entrance and exit openings; a revolving table in said enclosure, extending outside the same between said entrance and exit; carriers on said table shiftable relative thereto between inner and outer positions, in one of which positions they pass through said exit and entrance openings with intermediate travel outside, and also turnable to diverse angular positions; means below the table top for shifting said carriers as aforesaid; and means actuated by said means below the table top for engaging said carriers above it and turning them, to align them to pass through said entrance and exit openings, and to place them in a different angular relation to the table for travel within the enclosure.

2. A machine of the character described comprising an enclosure with entrance and exit openings; a revolving table in said enclosure, extending outside the same between said entrance and exit; carriers on said table shiftable relative thereto between inner and outer positions, in one of which positions they pass through said exit and entrance openings with intermediate travel outside, and also turnable to diverse angular positions; a longitudinally reciprocating member for shifting the carriers at opposite sides of the table as aforesaid; and means beyond the ends of said member, actuated thereby as said member moves to and fro, for engaging said carriers above the table and turning them, to align them to pass through said entrance and exit openings, and to place them in a different angular relation to the table for travel within the enclosure.

3. A machine of the character described comprising an enclosure with entrance and exit openings; a revolving table in said enclosure, extending outside the same between said entrance and exit; carriers on said table shiftable relative thereto between inner and outer positions, in one of which positions they pass through said exit and entrance openings with intermediate travel outside, and also turnable to diverse angular positions; a longitudinally reciprocating member for shifting the carriers at opposite sides of the table as aforesaid; and means for directly engaging said carriers and turning them, comprising an arm above the table top and an operating arm therefor in the path of the end of said reciprocating member.

4. A machine of the character described comprising an enclosure with entrance and exit openings; a revolving table in said enclosure, extending outside the same between said entrance and exit; carriers on said table shiftable relative thereto between inner and outer positions, in one of which positions they pass through said exit and entrance openings with intermediate travel outside, and also turnable to diverse angular positions; means below the table top for shifting said carriers as aforesaid; and a double arm device pivoted about a horizontal axis to swing radially of the table to engage said carriers above the table top and turn them to a definite radial position for travel within the enclosure, regardless of which way they are turned when they enter it.

In testimony whereof, we have hereunto signed our names at Philadelphia, Pennsylvania, this first day of September, 1927.

WALTER W. SIBSON.
HARRY H. WIGGLESWORTH.